United States Patent
Seki et al.

(10) Patent No.: US 7,716,811 B2
(45) Date of Patent: May 18, 2010

(54) METHOD FOR MANUFACTURING A THIN FILM MAGNETIC HEAD

(75) Inventors: Takateru Seki, Yokohama (JP); Akihiro Namba, Kanagawa (JP); Hideo Yamakura, Kanagawa (JP); Takahiro Noji, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 158 days.

(21) Appl. No.: 11/588,866

(22) Filed: Oct. 27, 2006

(65) Prior Publication Data

US 2007/0119046 A1     May 31, 2007

(30) Foreign Application Priority Data

Oct. 28, 2005   (JP)   ............................. 2005-314100

(51) Int. Cl.
  *G11B 5/127*   (2006.01)
  *H04R 31/00*   (2006.01)

(52) U.S. Cl. ...................... 29/603.1; 29/417; 29/603.12; 29/603.15; 29/603.16; 29/603.18; 360/235.7; 360/235.8; 360/236.3; 360/236.5; 451/5; 451/8; 451/10; 451/37; 451/41

(58) Field of Classification Search .................... 29/417, 29/603.12, 603.15, 603.16, 603.18; 451/5, 451/8, 10, 36, 37, 41; 360/235.7, 235.8, 360/236.3, 236.5

See application file for complete search history.

(56) References Cited

U.S. PATENT DOCUMENTS

| | | | |
|---|---|---|---|
| 5,328,716 A | | 7/1994 | Buchanan |
| 5,713,123 A | * | 2/1998 | Toyoda et al. ............. 29/603.12 |
| 6,050,879 A | * | 4/2000 | Dubrovskiy et al. .......... 451/36 |
| 6,123,781 A | | 9/2000 | Shimazawa |
| 6,331,924 B1 | | 12/2001 | Takada |
| 6,497,611 B2 | * | 12/2002 | Sakurada et al. ............... 451/5 |

(Continued)

FOREIGN PATENT DOCUMENTS

JP     04-368605 A     12/1992

(Continued)

OTHER PUBLICATIONS

Japanese Office Action for Application No. 2005-314100, date of mailing Jan. 5, 2010, 2 pages total.

*Primary Examiner*—Paul D Kim
(74) *Attorney, Agent, or Firm*—Townsend and Townsend and Crew LLP; Rambod Nader (57) ABSTRACT

Head elements are formed on a wafer to suppress deterioration in pinning strength of a pinned layer, which is caused by ESD generated during air bearing surface polishing of a thin film magnetic head. The wafer is cut into rovers in each of which are connected head elements. Rover air bearing surfaces are polished until an MR elements attain a predetermined height. A final polishing step finishes air bearing surfaces by applying an electroconductive polishing liquid to achieve a predetermined shape and surface roughness with high accuracy. A pinning defect occurrence rate is reduced by suppressing deterioration in pinning strength of a pinned layer of a read element. To achieve this, a specific resistance of the electroconductive polishing liquid is controlled to 5 GΩ·cm or less. A shallow rail and a deep rail are formed on the air bearing surfaces, and the rover is cut into thin film magnetic heads.

8 Claims, 10 Drawing Sheets

U.S. PATENT DOCUMENTS

| | | |
|---|---|---|
| 7,149,061 B2 | 12/2006 | Yamakura et al. |
| 7,268,976 B2 | 9/2007 | Yamakura et al. |
| 2004/0154931 A1 * | 8/2004 | Hongo et al. ............... 205/676 |

FOREIGN PATENT DOCUMENTS

| | | |
|---|---|---|
| JP | 09-044820 | 2/1997 |
| JP | 09-167314 | 6/1997 |
| JP | 09-180146 | 7/1997 |
| JP | 2003-006816 | 1/2003 |
| JP | 2003-115102 | 4/2003 |

* cited by examiner

FIXED ABRASIVE PLATE

POLISHING LIQUID

THIN FILM MAGNETIC HEAD

METHOD FOR MANUFACTURING A THIN FILM MAGNETIC HEAD

CROSS-REFERENCES TO RELATED APPLICATIONS

The instant nonprovisional application claims priority to Japanese Patent Application No. JP 2005-314100 filed Oct. 28, 2005 and incorporated by reference herein for all purposes.

BACKGROUND OF THE INVENTION

Embodiments in accordance with the present invention relate to a method for producing a thin film magnetic head to be used for a disk storage unit.

Recently, a capacity of a disk storage unit used as an external storage of a computer has been increased, and a recording density of the same has been increased year by year. Briefly speaking, the disk storage unit is formed of a magnetic disk and a magnetic head. The magnetic head is provided with an inductive magnetic exchange element (inductive element) serving as a write element and a giant magnetoresistive (GMR) element serving as a read element. In order to realize the high recording density, it is necessary to downsize the read element and the write element as well as to decrease the size of 1 bit on the magnetic disk. Therefore, in order to achieve the high recording density, the element sizes are reduced year by year, particularly, the size of the GMR element serving as the read element has been reduced to the order of submicron. With the reduction in the element size described above, electrical strength for electrical damages such as ESD (Electro-Static Discharge) and EOS (Electrical OverStress) on the GMR element is reduced to raise problems such as hard ESD that causes the GMR element to be melted due to an overcurrent in the magnetic head production process and soft ESD that deteriorates magnetic properties.

[Patent Publication 1] JP-A-09-44820
[Patent Publication 2] JP-A-11-296817
[Patent Publication 3] JP-A-10-241124
[Patent Publication 4] JP-A-2003-6816

In conventional technologies, for the purpose of preventing the damage due to ESD from being inflicted on the GMR element, a condenser, for example, is incorporated into the magnetic head to prevent the overcurrent from flowing to the GMR element as disclosed in Patent Publication 1 and Patent Publication 2. Further, a method of recovering the magnetic properties of the magnetic head deteriorated due to the soft ESD by supplying a direct current to the GMR element and a method of recovering by a pulse current and a static magnetic field are disclosed in Patent Publication 3 and Patent Publication 4.

As described in the foregoing, one of means for achieving the high recording density of the disk storage unit is to reduce the element size of the magnetic head and to reduce the size of 1 bit to be recorded on the magnetic disk. However, along with the reduction in element size, the voltage strength for ESD (Electrostatic Discharge) is reduced to cause a defect of melting of GMR due to the overcurrent and a defect of deterioration in magnetic properties. Particularly, in regards to the soft ESD that deteriorates the magnetic properties, it has not been clarified by now in which one of process steps of the production process and by what cause the soft ESD occurs. Therefore, methods of previously incorporating a protection circuit for ESD or of recovering a magnetic head whose properties are deteriorated have heretofore been employed. However, these technologies have the following problems.

For example, in the method of preventing the overcurrent from flowing to the GMR element by incorporating a condenser into the magnetic head, it is necessary to suppress increases in production process and production cost due to addition of a process of producing the condenser. Also, since the magnetic head having the condenser is ultimately incorporated into a disk storage unit, it is necessary to prevent frequency properties from being deteriorated in a disk storage unit handling a high frequency signal.

In turn, in the method of recovering the magnetic properties of the magnetic head with the use of the direct current and the pulse current, due to the necessity of adding a process of property recovery, it is necessary to suppress increases in production process and production cost. Also, though the deterioration in magnetic properties is judged from a degree of a change in resistance of the GMR element measured by applying an alternating magnetic filed to the magnetic head, the magnetic field used in the conventional technology is insufficient for correctly judge the magnetic properties deterioration in view of the fact that a remarkably large magnetic field is required for correctly determine the deterioration in magnetic properties, and it is probable that a very small deterioration is missed by such judgment.

An object of this invention is to provide a method for producing a thin film magnetic head, which enables to solve the above-described problems and to suppress deterioration in magnetic properties of a read element during a production process without increasing a production process and a production cost.

BRIEF SUMMARY OF THE INVENTION

Head elements are formed on a wafer in order to suppress deterioration in pinning strength of a pinned layer, which is caused by ESD generated during a thin film magnetic head production process, particularly in an air bearing surface polishing step. The wafer is cut line by line into rovers in each of which the head elements are connected; surfaces to be used as air bearing surfaces of the rover are polished until an MR element height reaches to a predetermined value. After this air bearing surface polishing, an electroconductive polishing liquid is used in a final bearing surface polishing step of finishing the air bearing surfaces to achieve a predetermined shape with high accuracy and a predetermined value of a surface roughness. In order to suppress a pinning defect occurrence rate by suppressing deterioration in pinning strength of a pinned layer of a read element, a specific resistance of the electroconductive polishing liquid is controlled to GΩ·cm or less, preferably 1 GΩ·cm or less. After that, a shallow rail and a deep rail are formed on the air bearing surfaces, and the rover is cut to accomplish thin film magnetic heads.

DETAILED DESCRIPTION OF THE INVENTION

As a basic structure of a magnetoresistive effect element such as a GMR element incorporated into a thin film magnetic head, the GMR element is formed of an antiferromagnetic layer, a ferromagnetic layer (pinned layer), a non-magnetic layer, and a ferromagnetic layer (free layer). In the pinned layer, an orientation of magnetization is pinned by an exchange coupling generated on a boundary between the pinned layer and the antiferromagnetic layer. In the free layer, an orientation of magnetization is changed in accordance with a magnetization orientation of a magnetic layer on the magnetic disk. By using the characteristic that a resistance of the GMR element is changed with a change in angle formed by the magnetization orientation of the pinned layer and the magnetization orientation of the free layer, information on the magnetic disk is read. The magnetic properties deterioration noted in this invention is a reduction in pinning strength that is exchange coupling of the antiferromagnetic layer and the pinned layer. With the reduction in pinning strength, the magnetization orientation of the pinned layer is reversed to reverse an output from the thin film magnetic head. Also, the pinning strength can be further reduced due to certain damage in post processing, and such reduction changes or reverses the magnetization orientation to cause problems such as reduction in or reversal of the output.

Figure 4:
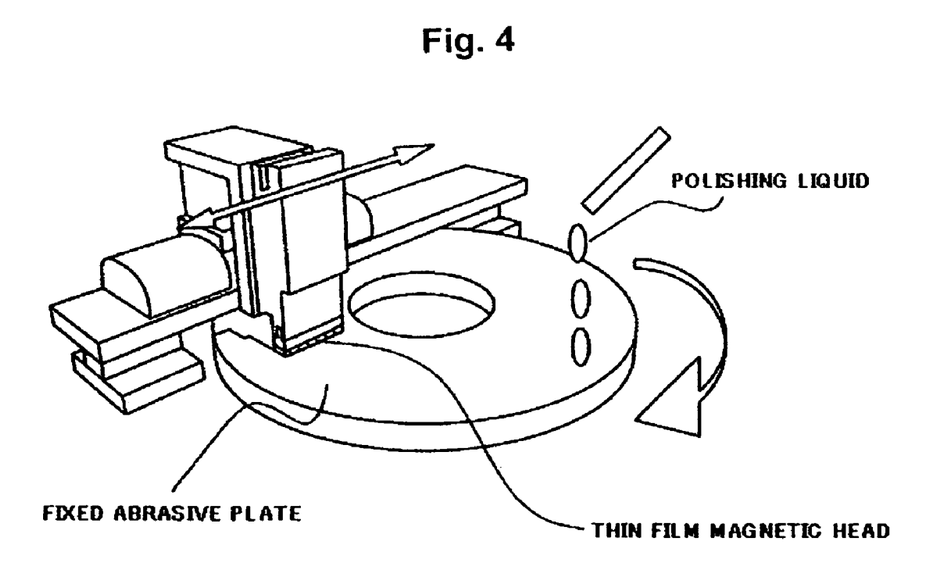
FIG. 4 is a diagram showing a method of polishing a thin film magnetic head air bearing surface.
Figure 5:
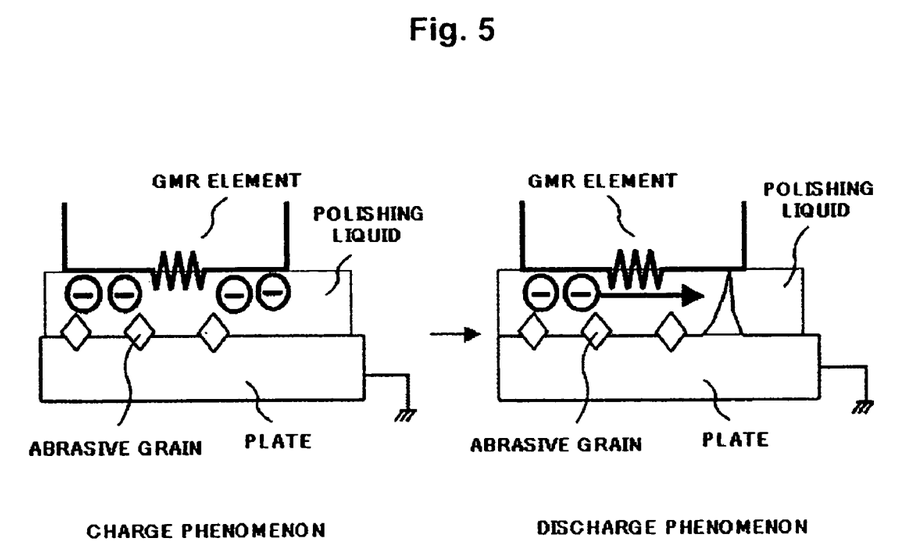
FIG. 5 is a conceptual diagram illustrating ESD mechanism during a thin film magnetic head air bearing surface polishing step.
Figure 6:
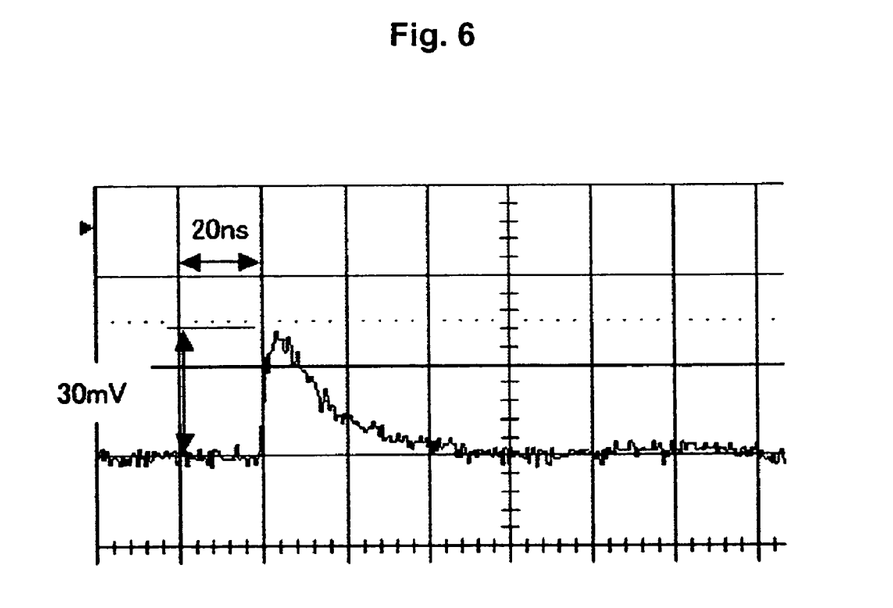
FIG. 6 is a diagram showing one example of measurement of ESD phenomenon during the thin film magnetic head air bearing surface polishing step.

As a result of searching a process step in which the deterioration in pinning strength occurs, it has been detected that the process step is a step of polishing an air bearing surface of the magnetic head which is to be opposed to a magnetic disk. The magnetic head air bearing surface polishing step is a step of polishing the air bearing surface of the thin film magnetic head by pressing, as shown in FIG. 4, a surface of the thin film magnetic head to be used as the air bearing surface against a plate obtained by embedding fine diamonds on a soft metal plate, which is called fixed abrasive plate, and rotating the plate with an oil-based polishing liquid which does not contain diamond being dripped thereon, thereby directly polishing the GMR element. The polishing liquid used in the step is oil-based and has insulating property, and the plate is earthed. By the polishing step under such environment, the GMR element is electrically charged due to frictional charge as shown in FIG. 5. After that, when the GMR element is brought into contact with the earthed plate, charged electrons pass through the GMR element to be discharged to the plate. FIG. 6 is a diagram showing one example of measurement of the discharge phenomenon during an actual polishing processing. As shown in FIG. 6, it is apparent that the discharge occurs in a very short time period of several tens of nanoseconds. Also, a voltage is 30 mV in FIG. 6, but a waveform of from several tens to one hundred and several tens of metervolts was observed after repeating the experiment. It is considered that the pinning strength of the pinned layer of the GMR element is deteriorated due to the above-described ESD phenomenon.

In order to solve the problems, this invention provides two methods. One of them is to use an electroconductive polishing liquid in place of the insulating polishing liquid. A specific resistance of the electroconductive polishing liquid is 5 GΩ·cm or less, more preferably 1 GΩ·cm or less. By using the electroconductive polishing liquid, a potential of a magnetoresistive effect element and a potential of a plate become identical to each other to be free from the frictional charge, thereby making it possible to prevent the deterioration in pinning strength of the pinned layer otherwise caused by ESD.

The other one is to add a band-pass filter formed of a condenser and an inductor to a resistance measurement substrate. With such constitution, the path of the discharge of charged electrons to the plate is changed from the path of passing through the magnetoresistive effect element to a path of passing through the band-pass filter, thereby making it possible to prevent the deterioration in pinning strength of the pinned layer. More specifically, this invention provides a system capable of in-process monitoring of a resistance of the magnetoresistive effect element in an air bearing surface polishing step and terminating the step when an ultimate target resistance is achieved. Therefore, in the air bearing surface polishing processing, a direct current power source unit for supplying a direct current to the magnetoresistive effect element and a resistance measurement unit are incorporated into a polishing device, and, further, a resistance measurement substrate for connecting the polishing device and the magnetoresistive effect element to each other is provided in order to monitor the resistance of the magnetoresistive effect element. In accordance with embodiments of this invention, the band-pass filter formed of the condenser and the inductor is provided in the resistance measurement substrate, and a condenser capacity and an inductor capacity are optimized so that impedance of the band-pass filter is increased for the direct current used for the resistance measurement and the impedance is reduced for a high frequency component such as the frictional charge. With such constitution, the electrons charged by the frictional charge do not pass through the magnetoresistive effect element but pass through the bandpass filter to flow to the plate.

According to embodiments of this invention, it is possible to suppress deterioration in magnetic properties of a read element during its production process without increases in production process and production cost.

Figure 2A:
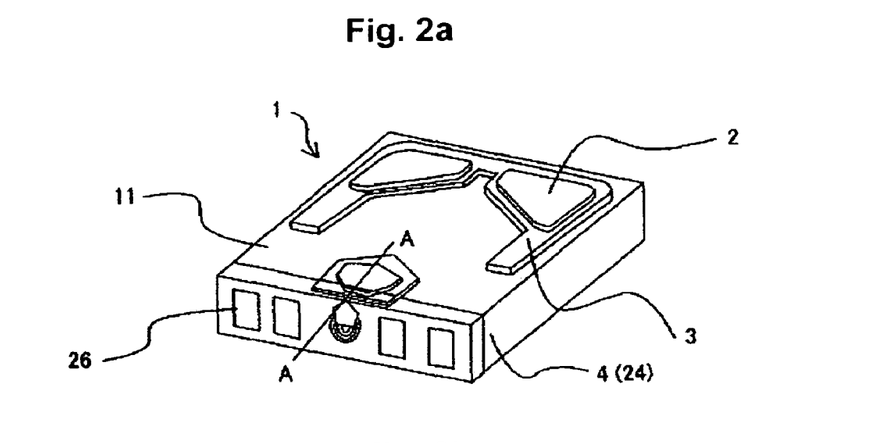
FIGS. 2a-c are diagrams showing a structure of a thin film magnetic head to which an embodiment of this invention is applied, wherein (a) is a perspective view, (b) is an enlarged block diagram showing an element unit as viewed from an air bearing surface side, and (c) is a sectional view taken along line A-A of (a).
Figure 2B:
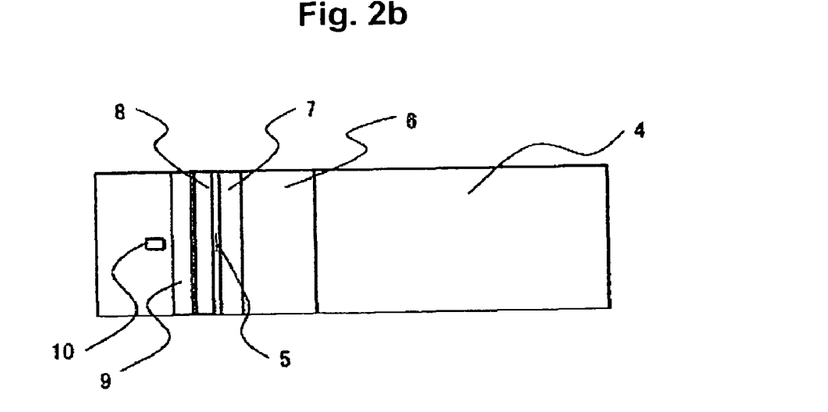
Figure 2C:
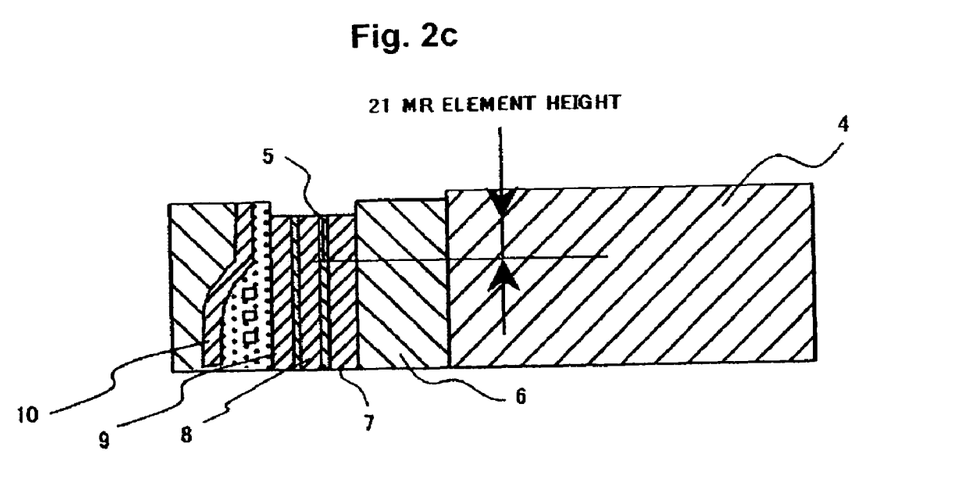

Hereinafter, embodiments of this invention will be described with reference to the drawings. FIG. 2(a) is a schematic diagram of a thin film magnetic head 1 according to an embodiment of this invention, FIG. 2(b) is an enlarged block diagram showing a head element unit as viewed from an air bearing surface side, and FIG. 2(c) is a sectional view of the head element unit taken along line A-A of FIG. 2(a). In FIGS. 2(a), (b), and (c), 4 denotes a substrate (or slider 24) formed from ceramic containing an altic material ($Al_2O_3$—TiC). On a side face of the slider 24, a protection film 6, a lower shield film 7, a read element (GMR element) 5 such as a magnetoresistive effect element, an upper shield film 8, a lower magnetic film 9 forming an inductive element serving as a write element, and an upper magnetic film 10 are stacked. Gold pads (terminals) 26 are used for obtaining signals from the read element and the write element and connected to the elements. On the air bearing surface 2 which is to be opposed to a magnetic disk, a shallow rail 3 and a deep rail 11 required for flying the magnetic head 1 on the magnetic disk by a predetermined amount are formed.

Figure 3:
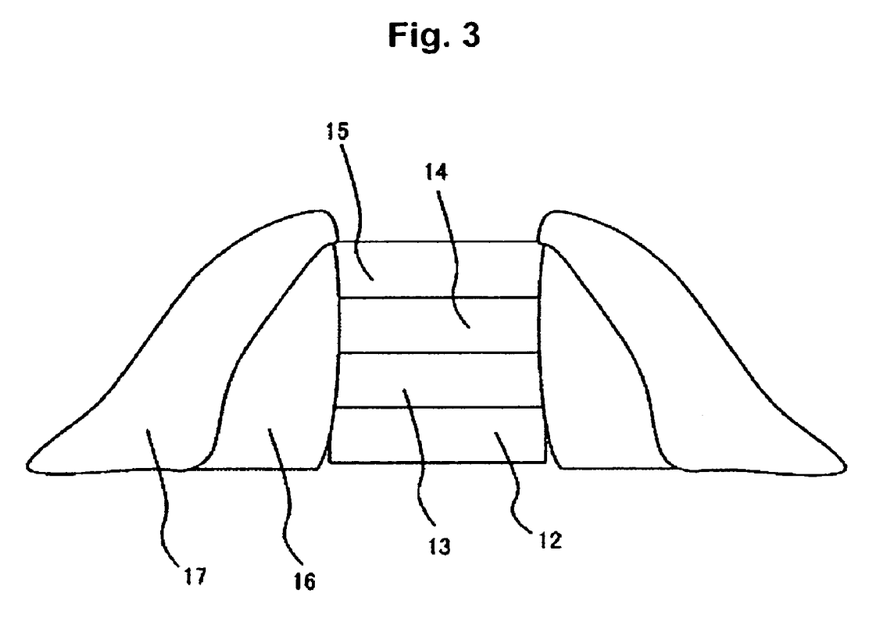
FIG. 3 is a diagram showing a basic structure of a GMR element.

FIG. 3 is an enlarged view showing a CIP (Current In the Plane) GMR element 5 as viewed from the air bearing surface side, which shows a basic structure of the GMR element 5. In FIG. 3, an antiferromagnetic layer 12 is and two ferromagnetic layers 13 and 15 are magnetically separated from each other by a non-magnetic layer 14. Hard bias films 16 and electrodes 17 are disposed on both sides of the magnetic layers. In the ferromagnetic layer (pinned layer) 13, an orientation of magnetization is pinned by an exchange-coupled magnetic field generated at a boundary with the antiferromagnetic layer 12. In turn, in the ferromagnetic layer (free layer) 15, an orientation of magnetization is varied in response to an external magnetic field. The disk storage unit reproduces information on the magnetic disk by using the characteristic that a resistance of the GMR element 5 changes depending on an angle formed by the pinned layer 13 and the free layer 15. More specifically, in the case where the magnetization orientation of the pinned layer 13 and the magnetization orientation of the free layer 15 are parallel to each other, the resistance of the GMR element 5 is minimized, while the resistance of the GMR element 5 is maximized when the magnetization orientations are non-parallel.

Embodiment 1

Figure 7:
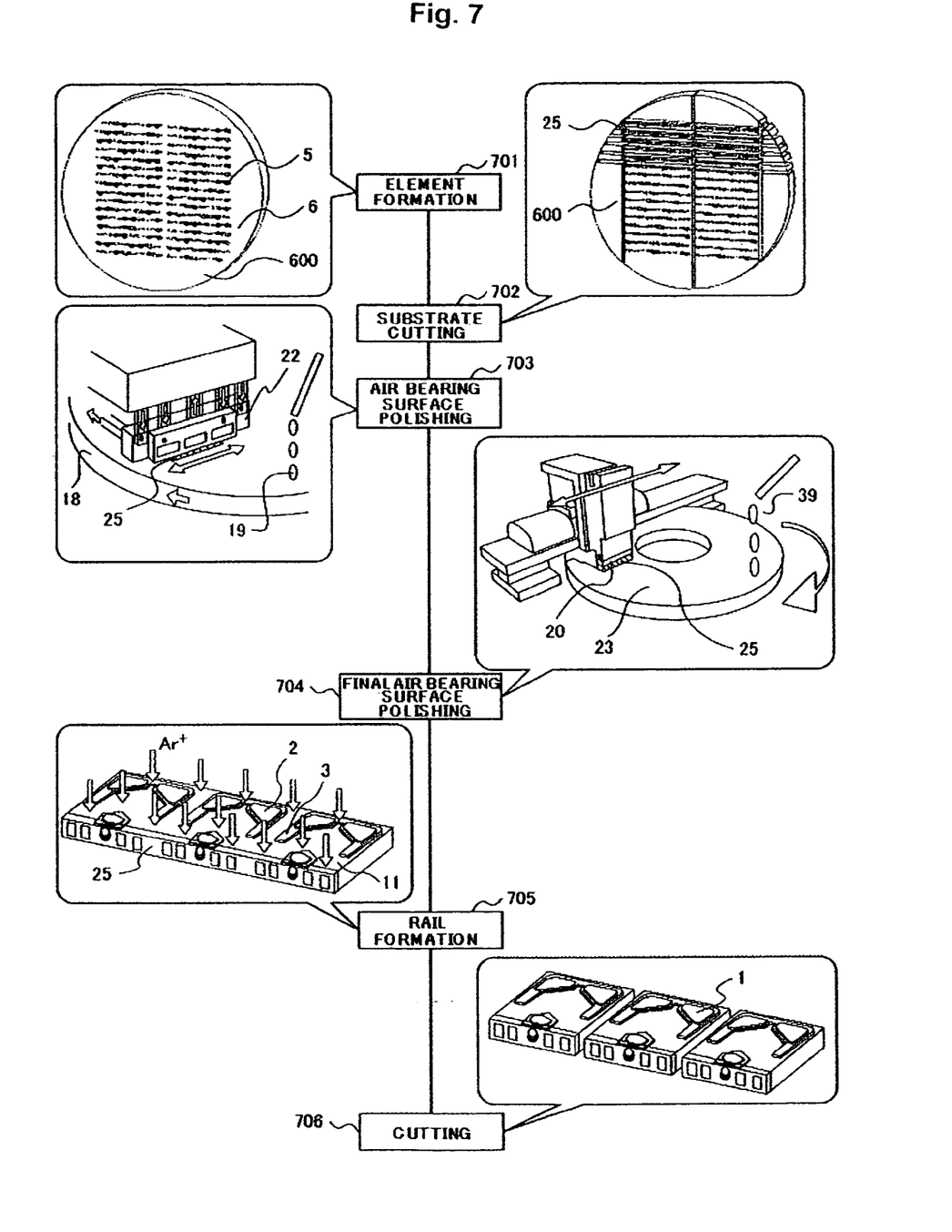
FIG. 7 is a flowchart illustrating a thin film magnetic head production method according to an embodiment of this invention.

FIG. 7 is a flowchart showing a thin film magnetic head production method according to Embodiment 1. In an element formation step 701 of FIG. 7, a protection film 6, a lower shield film 7, a GMR element 5, an upper shield film 8, a lower magnetic film 9, an upper magnetic film 10, and the like having the layer structure shown in FIG. 2(b) are stacked on a wafer 600 formed of ceramic made from an altic material ($Al_2O_3$—TiC) and the like employing a thin film formation technology such as sputtering and lithography. After that, in a substrate cutting step 702, the wafer 600 is cut line by line by using a grinding stone and a cutting technology such as wire saw to obtain blocks called row bar 25 in each of which plural head elements are connected. In this embodiment, the row bar 25 has 45 connected head elements, a length of about 2 inches, and a thickness of about 0.3 mm.

In an air bearing surface polishing step 703, after fixing the row bar 25 on a polishing jig 22 with the use of a wax or the like, polishing processing is performed in such a manner that surfaces which are to be used as the air bearing surfaces 2 are pressed against a polishing plate 18 while dripping a polishing liquid 19 thereon. An object of this step is to achieve a predetermined value of an MR element height 21 in all the head elements in the row bar 25, the MR element height 21 is a height of the GMR element 5 in a direction of the thickness of the row bar 25 shown in FIG. 2(c). Therefore, in order to achieve a variable polishing pressure in the rover 25, the polishing jig 22 is deformable with the aid of a voice coil or an air cylinder. Also, a resistance detection element is provided on a cutting margin between the adjacent head elements in the row bar 25, so that the polishing pressure in the row bar 25 is controlled while monitoring the resistance detection element during the polishing processing, thereby achieving the MR element height 21 with high accuracy.

Hereinafter, specific polishing conditions will be described. As the polishing plate 18, a soft metal plate containing tin as a main ingredient is used, and the plate rotation speed was set to 10 to 70 r/min. An oscillation speed of the polishing jig 22 is set to 20 to 60 mm/s. As the polishing liquid 19, an oil-based polishing liquid containing diamond having an average particle size of from ½ to ¹⁄₂₀ μm is used until the MR element height 21 reaches to the desired height for the purpose of ensuring processing efficiency and improving a surface roughness of the air bearing surfaces 2, and then dripping of the polishing liquid containing the diamonds is stopped when the MR element height 21 reaches to the desired height to drip an oil-based polishing liquid called lubricant, which does not contain diamond.

Next, in a final air bearing surface polishing step 704, a final finishing polishing is performed on the portions to be used as the air bearing surfaces 2 of the row bar 25. The final air bearing surface polishing step 704 is a step for finishing the air bearing surface 2 of each of the head elements of the row bar 25 to achieve a predetermined shape with high accuracy as well as to achieve a predetermined value of the surface roughness of the air bearing surface 2. More specifically, the rover 25 is attached to a polishing jig 20 for the final air bearing surface polishing step via an elastic body and then pressed against a polishing plate 23 having a surface of a predetermined shape (flat, spherical, or cylindrical) with a predetermined force. After that, the polishing plate 23 is rotated simultaneously with sliding the polishing jig 20 in a radial direction of the plate, thereby eliminating a predetermined processing amount (50 nm, for example). As the polishing plate 23, a plate made from a tin alloy in which fine diamonds of ½ to ¹⁄₂₀ μm are embedded, which is called a fixed abrasive plate, is used. During the polishing processing, the polishing plate 23 is rotated at 10 r/min, for example, and the polishing jig 20 is slid at 50 mm/s with an electroconductive polishing liquid 39 which does not contain diamond being dripped onto the polishing plate 23.

After the final polishing (step 704) of the air bearing surfaces 2 is completed, the shallow rail 3 and the deep rail 11 are formed on each of the air bearing surfaces 2 by ion milling and drying processing such as RIE in a rail formation step 705. More specifically, after fixing the row bar 25 to a jig for rail formation with the use of a thermoplastic adhesive tape, a resist is applied on surfaces of the air bearing surfaces 2, and then light exposure and development are performed, followed by eliminating portions other than the rails by the drying processing. After that, the resist remaining on the air bearing surface 2 is stripped. By repeating the process from the resist application to the resist stripping twice, the rails having a two-step shape shown in FIG. 2(a) is formed. Finally, in a cutting step 706, the row bar 25 is cut at cutting positions by dicing or wire saw to be divided, thereby obtaining thin film magnetic heads 1.

In the above-described thin film magnetic head production process, when the conventional insulating polishing liquid is used in the final air bearing surface polishing step 704, frictional charge is generated to damage the head elements. In this embodiment, in order to solve such problem, the electroconductive polishing liquid 39 was used as the polishing liquid.

A hydrocarbon-based oil having both a nonpolar group as a main chain and ionic group with a dissociable functional group as an electroconductive substance is used. A main ingredient of the electroconductive polishing liquid 39 is hydrocarbon-based oil having both a nonpolar group as a main chain and ionic group with a dissociable functional group as an electroconductive substance. Examples of the electroconductive substance include an anionic surface active agent such as sodium alkylbenzenesulfonate and a sodium salt of an aliphatic acid, a cationic surface active agent such as an organic onion salt.

In the case of a polishing liquid obtained by using a solvent having polarity, such as ethyleneglycol and propyleneglycol, as the base oil, an electroconductive substance representative examples of which are an anionic surface active agent and a cationic surface active agent such as an organic onion salt, for example, may be added to the polishing liquid. In the case where corrosion of the GMR element 5 is considered, an anticorrosion agent such as benzotriazole may be added. With the use of the electroconductive polishing liquid 39, it is possible to prevent the charge phenomenon during the polishing processing shown in FIG. 5, thereby suppressing deterioration in magnetic properties of the head element, specifically, pinning strength deterioration in the pinned layer 13 of the GMR element 5. In the case of using ethyleneglycol and propyleneglycol, lapping rate is higher than that of a hydrocarbon-based oil. But roughness of using ethyleneglycol and propyleneglycol is worse than that of a hydrocarbon-based oil. It seems to be better that a hydrocarbon-based oil is used because the quality of magnetic heads is very important.

Figure 8:
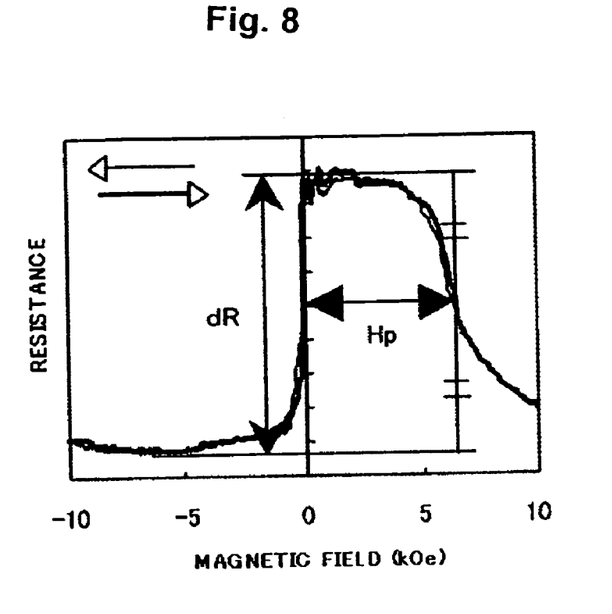
FIG. 8 is a diagram showing one example of measurement of pinning strength of the GMR element.

In order to quantitatively evaluate the pinning strength of the pinned layer 13, magnetic strength Hp with which a resistance change amount is reduced to half was calculated from an MR curve shown in FIG. 8, and the pinning strength is quantified from the value of Hp. The pinning strength is strong when the Hp value is large, and the pinning strength is weak when the Hp value is small. The MR curve was obtained by measuring a resistance of the GMR element 5 when a magnetic field of ±10,000 Oe (79.6×10$^4$ A/m) was added in a direction of the MR element height 21 shown in FIG. 2(c).

Figure 9:
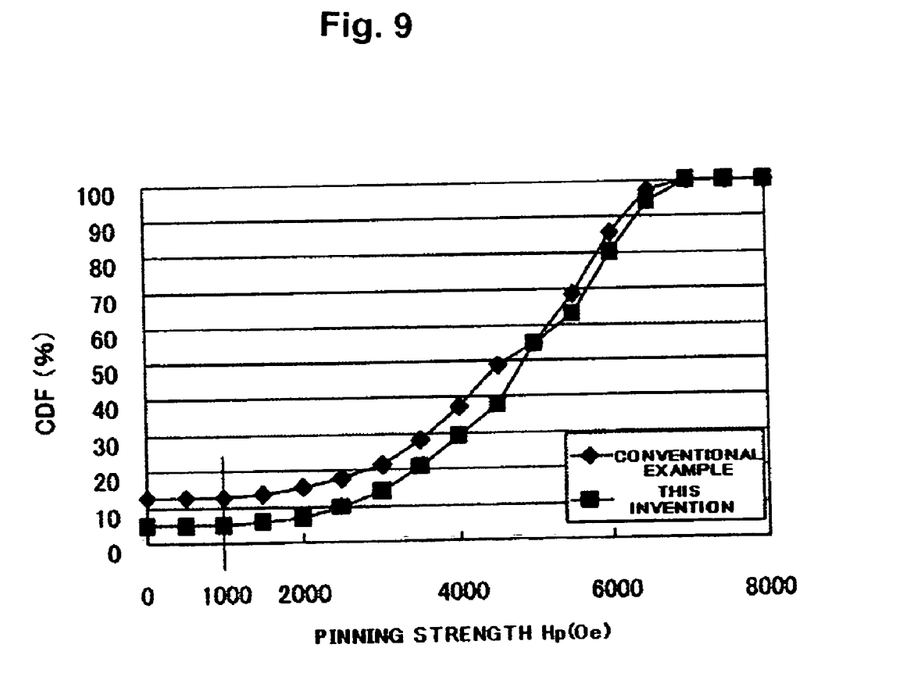
FIG. 9 is a diagram showing cumulative frequency distribution curves of the pinning strength, which indicates an effect of an embodiment of the present invention.

Shown in FIG. 9 are cumulative frequency distribution curves of the pinning strengths Hp after the final air bearing surface polishing step 704 obtained when using the conventional insulating polishing liquid and when using the electroconductive polishing liquid 39 of Embodiment 1. The electroconductive polishing liquid 39 had a specific resistance of 0.4 GΩ·cm. As is apparent from the result shown in FIG. 9, the pinning strength Hp achieved by the final air bearing surface polishing using the electroconductive polishing liquid 39 was 1,000 Oe (79.6×10$^3$ A/m) or less, which is remarkably small, while an occurrence rate was reduced to less than half (from 13% to 5%) with an increase in a median value (50%). In view of the foregoing, it is possible to suppress the deterioration in pinning strength of the pinned layer by performing the final air bearing surface polishing using the electroconductive polishing liquid 39, thereby making it possible to produce highly reliable thin film magnetic heads.

Figure 1A:
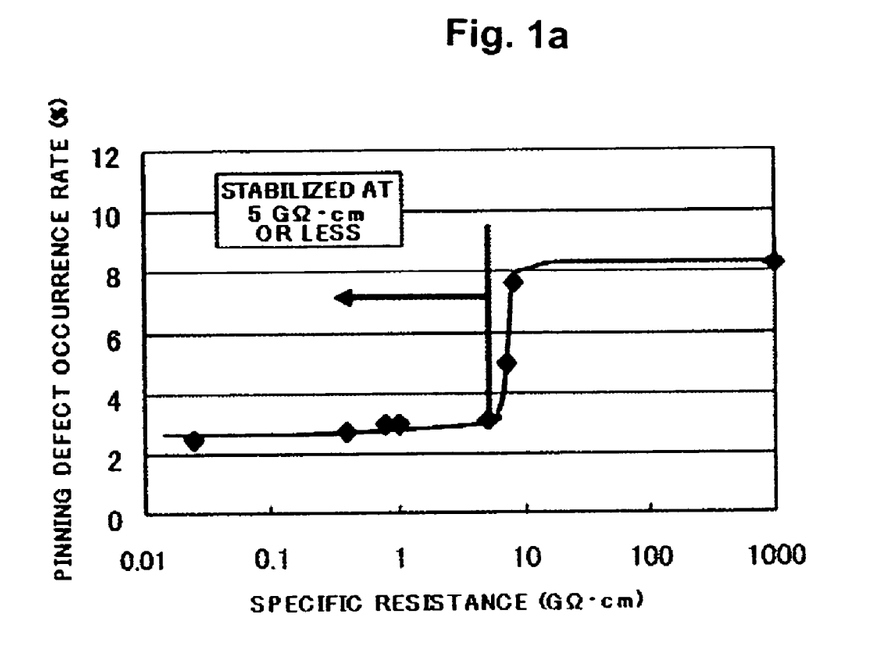
FIGS. 1a-b are diagrams showing a specific resistance required for an electroconductive polishing liquid of this invention, wherein (a) is a diagram showing a relationship between the specific resistance of the electroconductive polishing liquid and a pinning defect occurrence rate, and (b) is a diagram showing a relationship between the specific resistance and a discharge voltage during polishing processing.
Figure 1B:
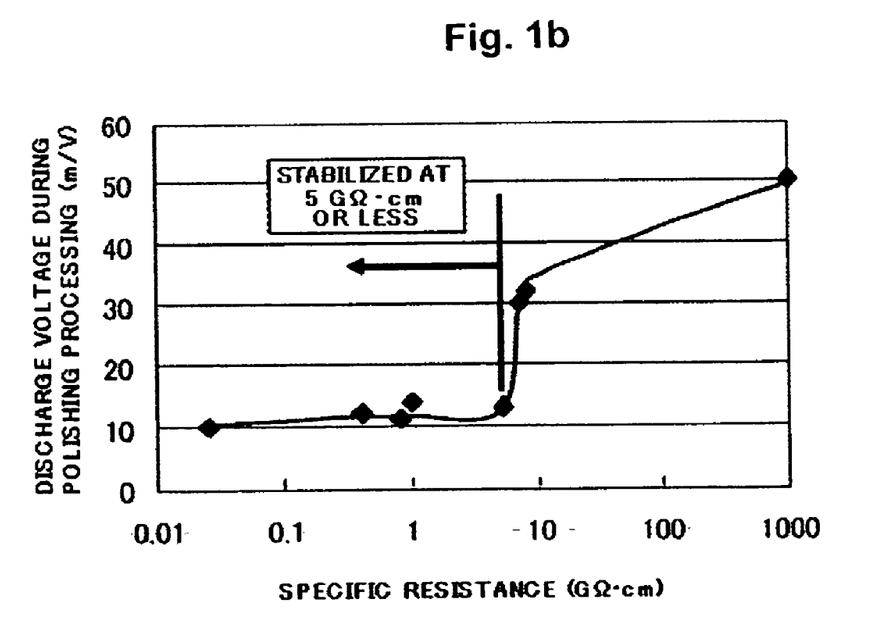

FIG. 1(a) is a diagram showing a relationship between the specific resistance of the electroconductive polishing liquid 39 and the pinning defect occurrence rate in the case of defining a pinning strength HP of 1,000 Oe (79.6×10$^3$ A/m) or less as the pinning defect. As is apparent from FIG. 1(a), it is necessary to control the specific resistance of the electroconductive polishing liquid 39 to 5 GΩ·cm or less, preferably to 1 GΩ·cm or less, in order to suppress the pinning defect occurrence rate. FIG. 1(b) is a diagram showing a relationship between the specific resistance of the electroconductive polishing liquid 39 and a discharge voltage during the polishing processing. In order to suppress the discharge voltage to 14 mV or less, it is necessary to control the specific resistance of the electroconductive polishing liquid 39 to 5 GΩ·cm or less, preferably to 1 GΩ·cm or less.

Though the final air bearing surface polishing is performed on the row bar in Embodiment 1, the final finishing polishing of the air bearing surface 2 may be performed on sliders on which the shallow rail 3 and the deep rail 11 are not formed by stripping off the row bar from the polishing jig and cutting the rover for dividing at predetermined cutting positions using slicing or wire saw after the air bearing surface polishing step 703. In this case, the rail formation is performed on each of the sliders after the final air bearing surface polishing to accomplish the thin film magnetic heads 1.

Though the example of using the electroconductive polishing liquid 39 for the final air bearing surface polishing step 704 is described in the foregoing, it is possible to suppress the pinning strength deterioration of the pinned layer due to the frictional charge in the air bearing surface polishing step 703 by using the electroconductive polishing liquid 39 also for the air bearing surface polishing step 703.

Embodiment 2

Basic process steps of a thin film magnetic head production method according to Embodiment 2 is the same as those of Embodiment 1 shown in FIG. 7. The ESD countermeasure during polishing processing in Embodiment 2 is used for the final air bearing surface polishing step 704 shown in FIG. 7. As described above, the final air bearing surface polishing step 704 is the step for performing the final finishing polishing on the portions to be used as the air bearing surfaces 2 of the head elements of the row bar 25. The final air bearing surface polishing step 704 is the step for finishing the air bearing surface 2 of each of the head elements of the row bar 25 to achieve a predetermined shape with high accuracy as well as to achieve a predetermined value of the surface roughness of the air bearing surface 2. More specifically, the row bar 25 is attached to a polishing jig 20 for the final air bearing surface polishing step via an elastic body and then pressed against a polishing plate 23 having a surface of a predetermined shape (flat, spherical, or cylindrical) with a predetermined force. After that, the polishing plate 23 is rotated simultaneously with sliding the polishing jig 20 in a radial direction of the plate, thereby eliminating a predetermined processing amount (50 nm, for example). As the polishing plate 23, a plate made from a tin alloy in which fine diamonds of ½ to ½0 μm are embedded, which is called a fixed abrasive plate, is used. During the polishing processing, the polishing plate 23 is rotated at 10 r/min, for example, and the polishing jig 20 is slid at 50 mm/s with an oil-based and insulating polishing liquid 19 which does not contain diamond being dripped onto the polishing plate 23.

Figure 10:
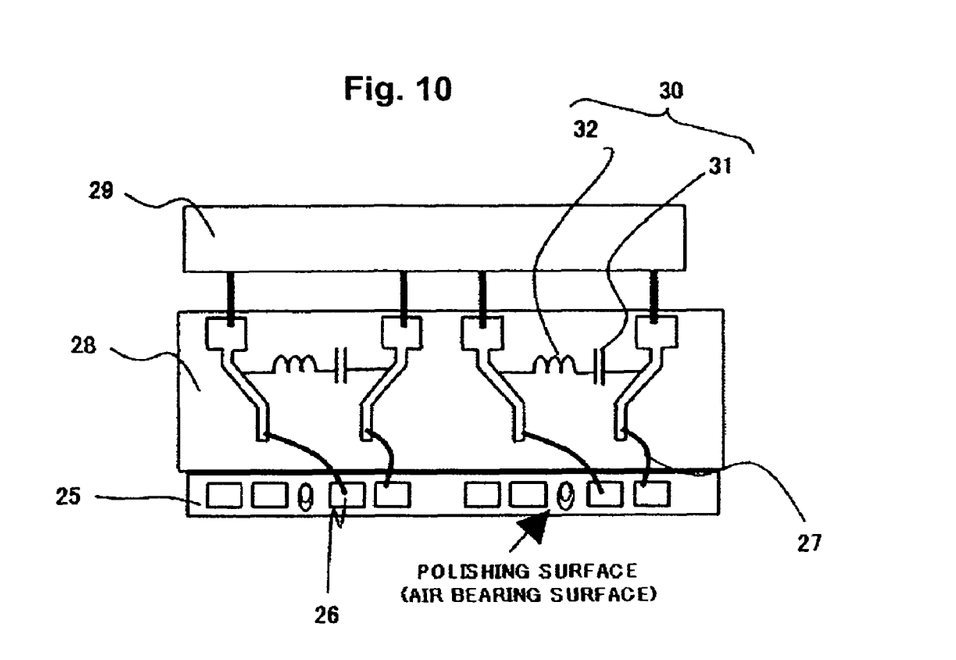
FIG. 10 is a diagram for illustrating a thin film magnetic head production process according to an alternative embodiment of this invention, wherein resistance monitoring during a final air bearing surface polishing step and a method of ESD countermeasure are shown.

Also, in the final air bearing surface polishing step 704, in order to form the MR element height 21 shown in FIG. 2(c) with high accuracy, a sequence of performing in-process monitoring of a resistance of the GMR element 5 and terminating the processing when the resistance of the GMR element 5 reaches to a target value is adopted. More specifically, as shown in FIG. 10, gold wires 27 are connected to the gold pads 26 connected to the GMR elements 5 of the row bar 25 and wiring patterns of a resistance measurement substrate 28 by wire bonding or the like. The resistance measurement substrate 28 is connected to a resistance measurement unit 29 incorporated into a polishing device, and a direct current of 0.2 mA, for example, is supplied to the GMR elements 5 via the resistance measurement substrate 28 and the gold wires 27 from the resistance measurement unit 29 to measure a voltage by using the resistance measurement unit 29, thereby enabling the monitoring of the resistances of the GMR elements 5.

Figure 11:
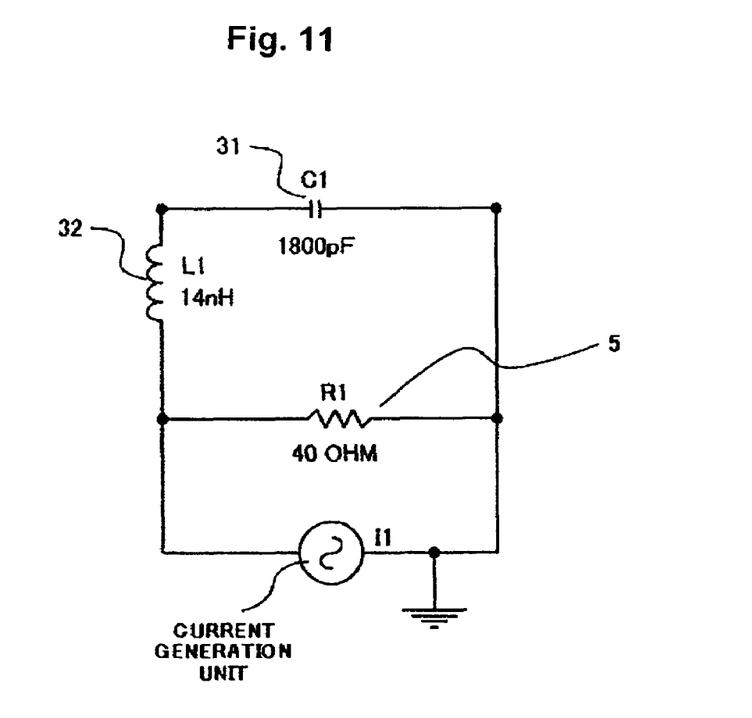
FIG. 11 is an equivalent circuit diagram of FIG. 10.

This embodiment enables to achieve both of the ESD countermeasure and the resistance monitoring, and, more specifically, a band-pass filter 30 formed of a condenser 31 and an inductor 32 is connected between the wiring patterns of the resistance measurement substrate 28 as shown in FIG. 10. Shown in FIG. 11 is an equivalent circuit (of this embodiment), and, in order to set a target frequency to be band-passed to 30 MHz which is obtained by Fourier conversion of the waveform shown in FIG. 6, a capacity of the condenser 31 is set to 1,800 pF and a capacity of the inductance 32 is set to 14 nH. With the provision of the band-pass filter 30, a high impedance is achieved for the direct current for the resistance measurement, while the impedance is reduced for the high frequency component shown in FIG. 6; therefore, charged electrons do not pass through the GMR elements 5 but pass through the band-pass filters 30 to be discharged to the polishing plate 23.

Figure 12:
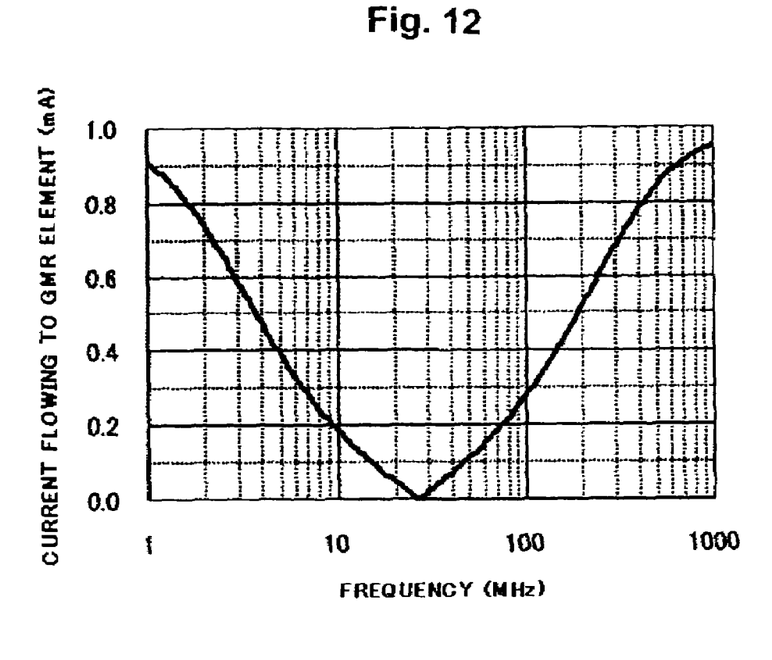
FIG. 12 is a diagram showing a calculation result indicating a frequency characteristic of the band-pass filter of FIG. 10.

Shown in FIG. 12 is a result of calculation indicating a characteristic of the band-pass filter 30. The result shown in FIG. 12 is obtained by generating a current of 1 mA in a current generation unit in FIG. 11 and then detecting a value of a current flowing through the GMR element 5 when a frequency of the current is changed. The impedance of the band-pass filer 30 is most reduced near 30 MHz, while the high impedance is achieved in a low frequency region such as the direct current.

In FIG. 10, in the case of not providing the band-pass filter 30, the charged electrons do not flow to the resistance measurement unit 29 but pass through the GMR elements 5 to be discharged to the polishing plate 23 when the frictional charge as shown in FIG. 5 is generated. The reason for this is that a coil of high impedance is generally incorporated into the resistance measurement unit 29 in order to prevent ESD destruction of the GMR elements 5 due to influences of external noise and the like, and, therefore, the charged electrons flow through the GMR elements 5 which are smaller in impedance. A method of shortening the gold pad 26 is generally employed as the ESD countermeasure of the GMR elements 5; however, it is impossible to monitor the resistances of the GMR elements 5 by this method. Also, a technology-of preventing an overcurrent and an overvoltage from effecting on the GMR elements 5 by adding a diode or a condenser to the gold pad 26 has been known; however, this invention focuses on the suppression of deterioration in pining strength of the pinned layer due to the weak voltage and current shown in FIG. 6, which is hardly overcome by the conventional technologies.

Figure 13:
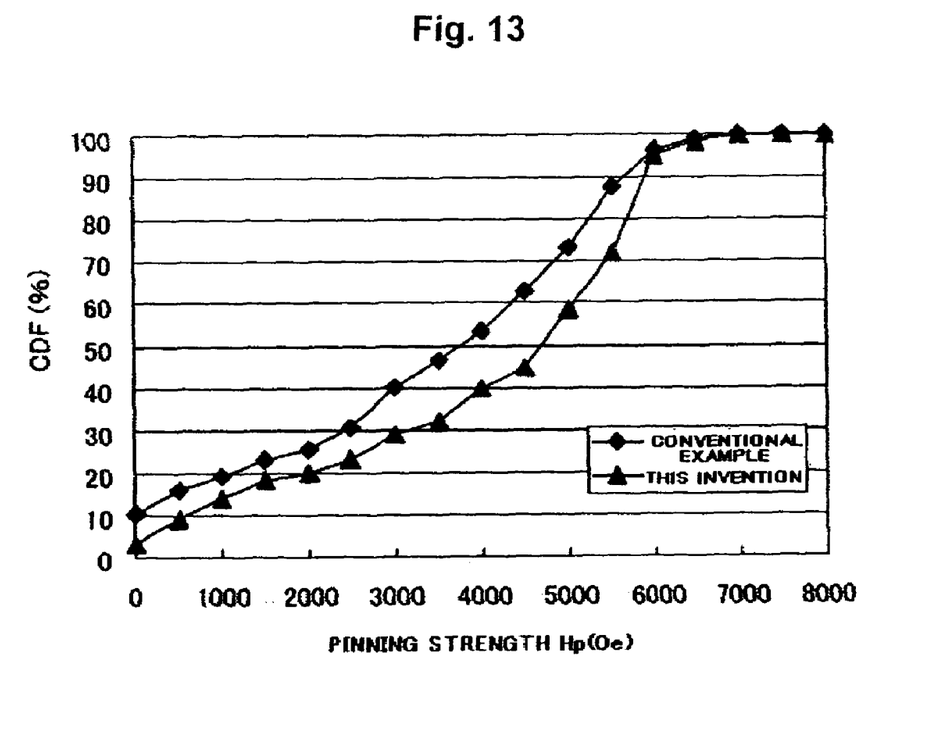
FIG. 13 is a diagram showing cumulative frequency distribution curves of pinning strength, which indicates an effect of Embodiment 2.

Shown in FIG. 13 are cumulative frequency distribution curves of the pinning strengths Hp after the final air bearing surface polishing step 704 obtained when employing the conventional production method and when employing the production method of Embodiment 2. As is apparent from the result shown in FIG. 13, the pinning strength Hp achieved by employing the production method of Embodiment 2 was 1,000 Oe (79.6×10$^3$ A/m) or less, which is remarkably small, while the occurrence rate was reduced from 20% to 15% with an increase in the median value (50%). In view of the foregoing, it is possible to suppress the deterioration in pinning strength of the pinned layer by employing the production method of Embodiment 2, thereby making it possible to produce highly reliable thin film magnetic heads.

Figure 14:
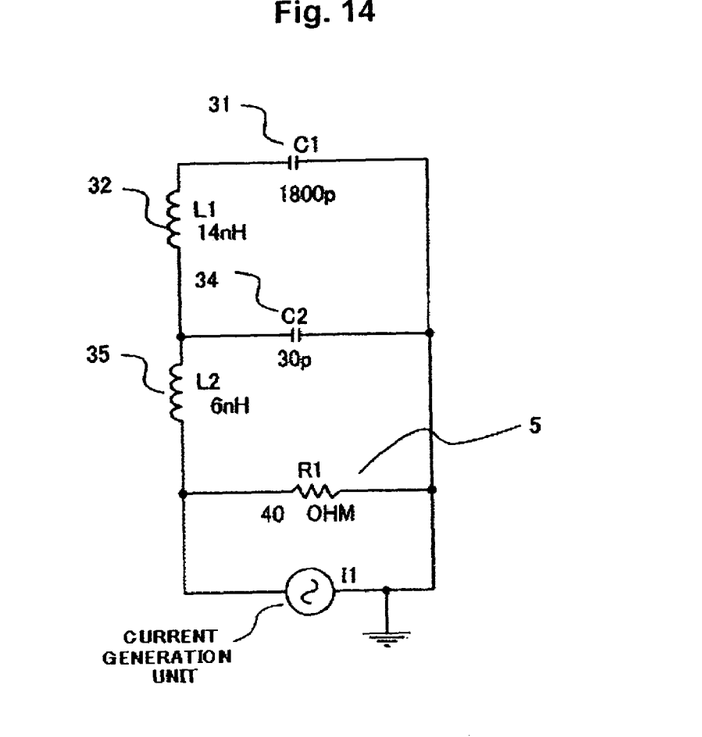
FIG. 14 is an equivalent circuit diagram when using a two-layer band-pass filter.
Figure 15:
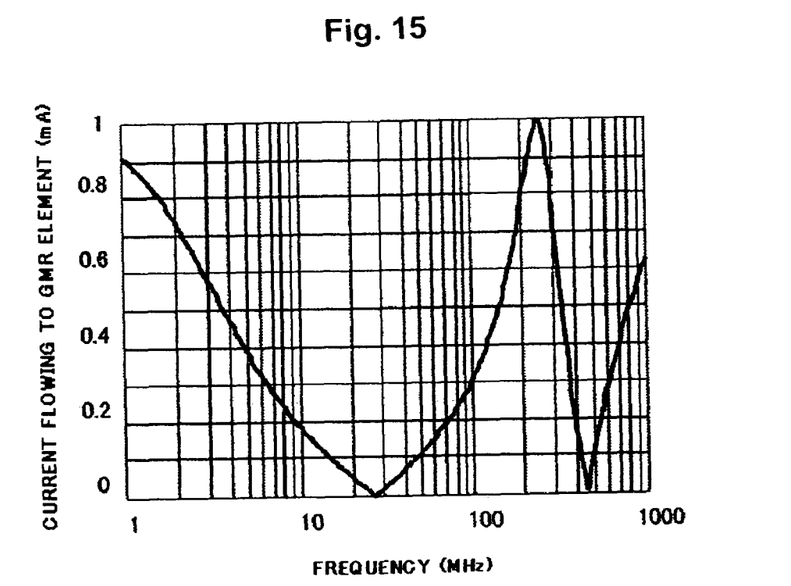
FIG. 15 is a diagram showing a calculation result indicating a frequency characteristic of the two-layer band-pass filter.

Though the capacity of the condenser 30 is set to 1,800 pF and the capacity of the inductor 31 is set to 14 nH in this embodiment, the capacities are not limited to the above, and it is desirable to optimize the capacities by measuring the discharge phenomenon shown in FIG. 6 in an actual line and determining a target frequency from the measurement result. Also, in the case where different two or more frequency waveforms are observed, it is recommended to use two or more layers of the band-pass filter. Shown in FIG. 14 is an equivalent circuit diagram of a case wherein target frequencies to be band-passed are 30 MHz and 500 MHz, and shown in FIG. 15 is a calculation result indicating a characteristic of the band-pass filter. In order to band-pass the 500 MHz, a capacity of a condenser 34 is set to 30 pF, and a capacity of an inductor 35 is set to 6 nH. As shown in FIG. 15, a desired frequency characteristic is obtained by using the two-layer band-pass filter.

It is possible to further reduce the deterioration in pinning strength of the pinned layer by using the electroconductive polishing liquid 39 described in Embodiment 1 in combination in the final air bearing surface polishing step of Embodiment 2, thereby enabling to produce thin film magnetic heads of increased reliability.

Figure 16:
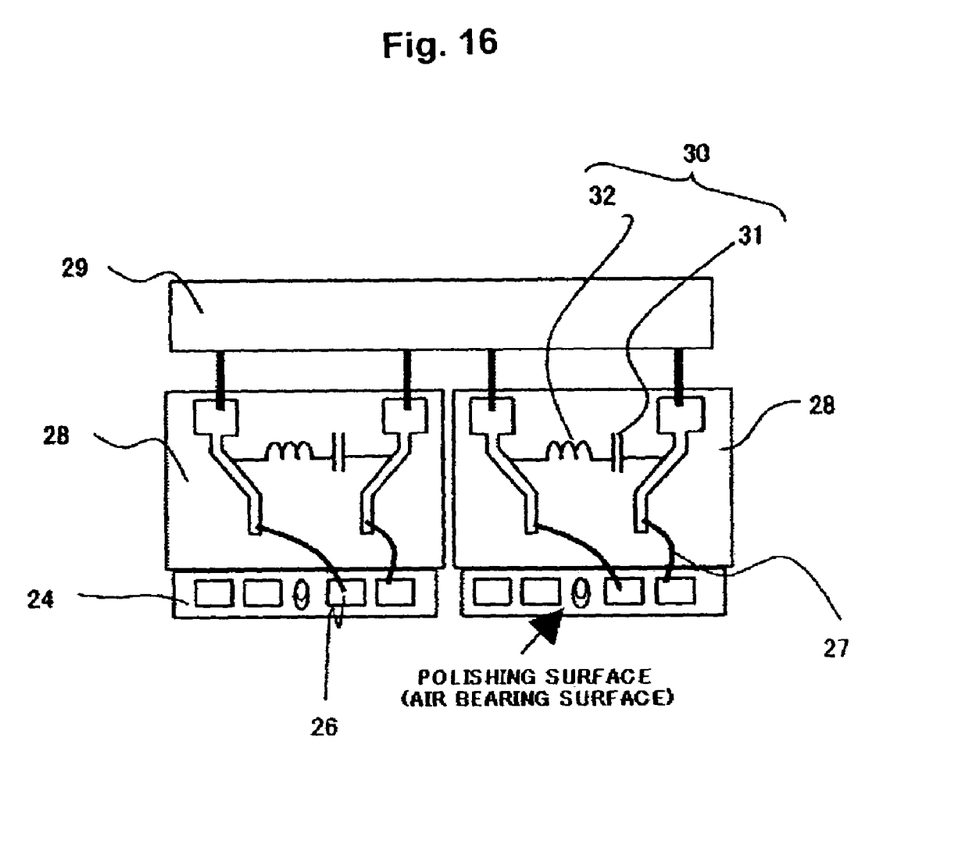
FIG. 16 is a diagram showing another example of the resistance monitoring and the ESD countermeasure method in Embodiment 2.

Though the ESD countermeasure during the polishing processing is performed on the row bar, the ESD countermeasure may be performed on sliders on which the shallow rails 3 and the deep rails 11 are not formed during the final finishing polishing of the air bearing surfaces 2 by stripping off the row bar from the polishing jig and cutting the rover for dividing at predetermined cutting positions using slicing or wire saw after the air bearing surface polishing step 703. More specifically, as shown in FIG. 16, the resistance measurement substrate 28 provided with the band-pass filter 30 having the condenser 31 and the inductor 32 is provided for each of the sliders 24, so that the charged electrons do not pass through the GMR elements 5 but pass through the band-pass filters 30 to be discharged to the polishing plate 23 in the same manner as in Embodiment 2.

As described in the foregoing, according to the embodiments of this invention, it is possible to suppress the deterioration in pinning strength of the ferromagnetic layer (pinned layer) of the magnetoresistive effect element thanks to the ESD countermeasure in the thin film magnetic head air bearing surface polishing step. Consequently, this invention enables to produce thin film magnetic heads of high yield and high reliability.

Though the CIP type GMR element is used as the read element in the foregoing embodiments, the read element is not limited thereto, and it is possible to achieve an effect similar to that of the foregoing embodiments by applying this invention to thin film magnetic head using a TMR (Tunneling Magnetoresistive) element or a CPP (Current Perpendicular to the Plane) type GMR element.

What is claimed is:

1. A method for manufacturing a thin film magnetic head comprising the steps of:
   - forming a plurality of head elements including read elements on a wafer;
   - cutting the wafer into row bars;
   - a first air bearing surface polishing step of polishing surfaces to be used as air bearing surfaces of the head in order to achieve a predetermined height of the read elements;
   - a second air bearing surface polishing step of polishing the polished surfaces to be used as the air bearing surfaces for finishing the polished surfaces as the air bearing surfaces having a predetermined shape while measuring resistances of the read elements by using a resistance measurement unit for measuring the resistances of the read elements to each of which a band-pass filter for passing a discharge of frictional charge generated during the polishing of the surfaces to be used as the air bearing surfaces is connected at a position between wiring patterns connected to terminals of the read element; and
   - forming rails on the finished air bearing surfaces having the predetermined shape.

2. The method for manufacturing the thin film magnetic head according to claim 1, wherein a capacity of the band-pass filter is decided by using a previously measured frequency of a discharge phenomenon.

3. The method for manufacturing the thin film magnetic head according to claim 1, wherein an electroconductive polishing liquid having a specific resistance of 5 GΩ·cm or less is used in the second air bearing surface polishing step.

4. The method for manufacturing the thin film magnetic head according to claim 3, wherein said electroconductive polishing liquid having a specific resistance of 5 GΩ·cm or less in the first air bearing surface polishing step.

5. A method for manufacturing a thin film magnetic head comprising the steps of:
   - forming a plurality of head elements including read elements on a wafer;
   - cutting the wafer into row bars;
   - a first air bearing surface polishing step of polishing surfaces to be used as air bearing surfaces of the head in order to achieve a predetermined height of the read elements;
   - cutting the row bars into sliders after the polishing;
   - a second air bearing surface polishing step of holding plural ones of the sliders and polishing the polished surfaces to be used as the air bearing surfaces for finishing the polished surfaces as the air bearing surfaces having a predetermined shape while measuring resistances of the read elements by using a resistance measurement unit for measuring the resistances of the read elements to each of which a band-pass filter for passing a discharge of frictional charge generated during the polishing of the surfaces to be used as the air bearing surfaces is connected at a position between wiring patterns connected to terminals of the read element; and
   - forming rails on the finished air bearing surfaces having the predetermined shape.

6. The method for manufacturing the thin film magnetic head according to claim 5, wherein a capacity of the band-pass filter is decided by using a previously measured frequency of a discharge phenomenon.

7. The method for manufacturing the thin film magnetic head according to claim 5, wherein an electroconductive polishing liquid having a specific resistance of 5 GΩ·cm or less is used in the second air bearing surface polishing step.

8. The method for manufacturing the thin film magnetic head according to claim 7, wherein said electroconductive polishing liquid having a specific resistance of 5 GΩ·cm or less is used in the first air bearing surface polishing step.

* * * * *